United States Patent
Hobbs (10) Patent No.: US 6,832,876 B2
(45) Date of Patent: Dec. 21, 2004

(54) MACHINE TOOLS

(75) Inventor: Steven Michael Hobbs, Birmingham (GB)

(73) Assignee: Delcam PLC, Birmingham (GB)

( * ) Notice: Subject to any disclaimer, the term of this patent is extended or adjusted under 35 U.S.C. 154(b) by 7 days.

(21) Appl. No.: 10/082,926

(22) Filed: Feb. 26, 2002

(65) Prior Publication Data

US 2002/0119020 A1 Aug. 29, 2002

(30) Foreign Application Priority Data

Feb. 27, 2001 (GB) .............................................. 0104780

(51) Int. Cl.⁷ ........................... B23C 9/00; B23Q 15/20; B23Q 15/08; G06F 19/00
(52) U.S. Cl. ........................... 409/84; 409/80; 409/132; 700/187; 700/188; 700/189; 700/193; 700/184
(58) Field of Search .............................. 409/80, 79, 84, 409/132; 700/187, 188, 189, 193, 186, 184

(56) References Cited

U.S. PATENT DOCUMENTS

| | | | | |
|---|---|---|---|---|
| 3,641,872 A | * | 2/1972 | Ulfhielm | ..................... 409/80 |
| 4,445,182 A | * | 4/1984 | Morita et al. | ................ 700/183 |
| 4,533,286 A | * | 8/1985 | Kishi et al. | .................... 409/80 |
| 4,833,617 A | | 5/1989 | Wang | |
| 4,949,270 A | * | 8/1990 | Shima et al. | ................ 700/184 |
| 5,363,308 A | * | 11/1994 | Guyder | ....................... 700/187 |
| 5,406,494 A | * | 4/1995 | Schuett | ....................... 700/188 |
| 5,923,561 A | | 7/1999 | Higasayama | |
| 6,491,482 B1 | * | 12/2002 | Fenkl et al. | ................ 409/132 |
| 6,591,158 B1 | * | 7/2003 | Bieterman et al. | .......... 700/187 |
| 2001/0043842 A1 | * | 11/2001 | Kaule et al. | ................ 409/132 |

FOREIGN PATENT DOCUMENTS

| | | | |
|---|---|---|---|
| DE | 19624131 A1 | * | 12/1997 |
| GB | 2111249 | | 6/1983 |
| GB | 2207776 | | 2/1989 |
| GB | 2355316 | | 4/2001 |
| GB | 2363208 | | 12/2001 |
| JP | 60-56811 A | * | 4/1985 |

* cited by examiner

Primary Examiner—Erica Cadugan
(74) Attorney, Agent, or Firm—Michael Best & Friedrich LLP (57) ABSTRACT

A machine tool 10 to fashion objects from blocks of material having a material-remover 16 able to move in at least two degrees of freedom and having the material 18 controlled by processing circuitry. The processing circuitry 18 determines a path along which the material-remover 16 should move, allowing the depth of a cut made by the material remover to vary. The movement of the material-remover 16 is so controlled to improve bulk material removal when compared to prior art machines.

23 Claims, 7 Drawing Sheets

MACHINE TOOLS

This invention relates to an improved machine tool, and improved methods of running a machine tool.

Machine tools can be used to fashion objects from blocks of material by removing excess material in a predetermined manner to arrive at the desired shape. This fashioning generally involves two processes: bulk material removal, or roughing, and fine working of the object. Bulk material removal is designed to remove excess material as quickly and as efficiently as possible to allow the fine working of the object to take place. Fine working of the object is a much finer process in which material removal is slower, more precise, and consequently the surface finish is higher.

To allow material to be removed a path must be planned for the material-remover of the machine tool. Traditionally this was performed by the manual control of a skilled operator. In the last few decades computer numerically controlled (CC) machine tools have become widespread and a set of instructions, or computer program, is used to control the path of the material-remover of the machine tool in such machines.

The set of instructions governing the path determines the efficiency of the bulk material removal process. It is desired to remove as much material in as little time as possible, but it is imperative that the material from which the object will be fashioned is not damaged.

Figure 1:
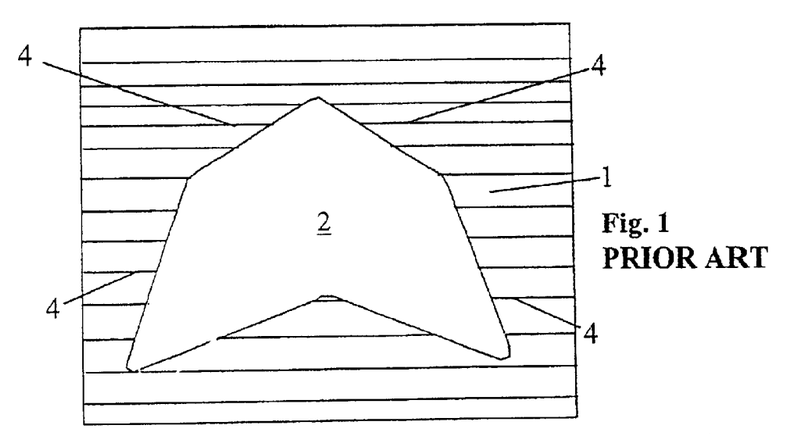
FIGS. 1 and 2 schematically show prior art methods of removing material from a work piece.
Figures 2, 3:
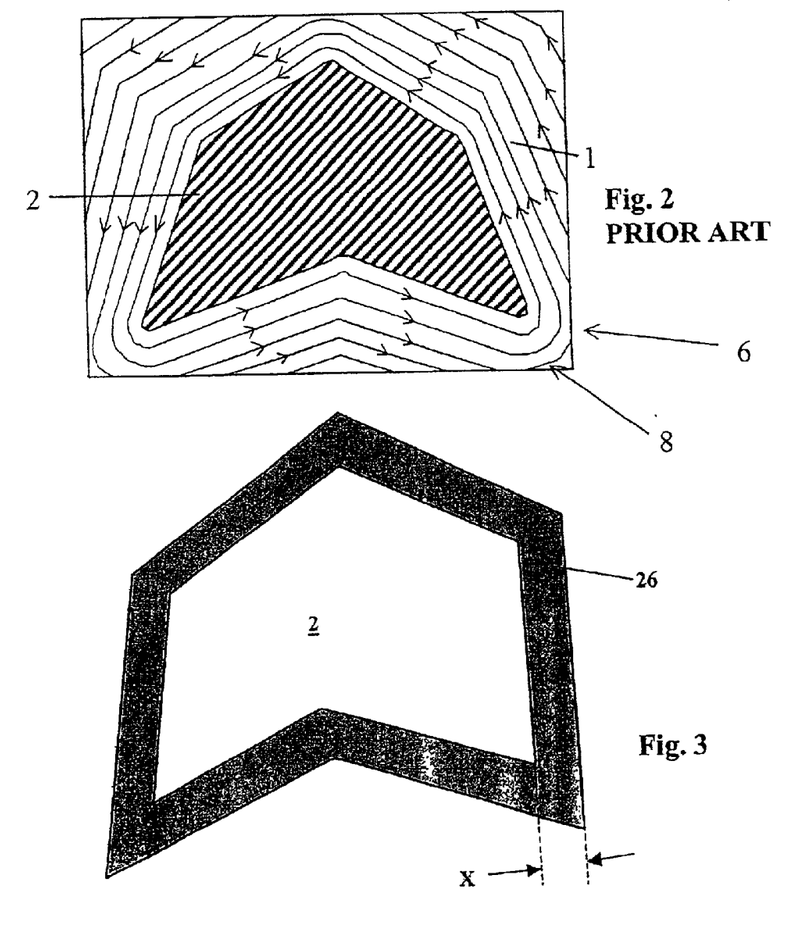
FIG. 3 to 7 illustrate steps in the method provided by the invention.

Various material removal methods are well known and FIGS. 1 and 2 show examples of two such methods. FIG. 1 shows perhaps the simplest approach in which material 1 around the object 2 is removed by raster scanning the machine tool. In each pass of the machine tool the material-remover will remove an amount of material 1, and the line 4 within the material 1 shows the centre line of each cut. It will be appreciated that this method is inefficient since the cutting tip does not run continuously, but must be stopped and moved around the object 2 in order to complete the cut on the opposite side of the object.

FIG. 2 shows another prior art method of performing the bulk material removal. Again, the line within the material 1 shows the path, or the centre line of a cut, performed by the cutting tip. The cutting tip makes a series of passes through the material 1 until only the object 2 remains.

However, none of the prior art methods discussed herein remove bulk material as efficiently as may be desired.

It is an object of the invention to ameliorate the problems of the prior art.

According to a first aspect of the invention there is provided a machine tool having a material-remover, the material-remover being able to move in at least two degrees of freedom and at a particular instant being arranged to remove an amount of material from material that it is processing, movement of said material-remover being under the control of processing circuitry, said processing circuitry determining a path along which the material-remover should move, and in determining said path allows the depth of a cut made by the material-remover to vary.

An advantage of such a machine is that it is likely to be more efficient than bulk material removal than prior art machine tools. Prior art machines are arranged to determine the path of a machine tool around the object such that the material-remover was constrained to remove roughly constant amount of material at any particular instant.

Prior art cutting machines remove slices of constant width from the material until the material has been removed as desired. This is as discussed in relation to FIGS. 1 and 2 above. The applicants have realised that the prior art machines are sub-optimal because the amount of material removed on each cut is constant and that therefore, the solution for the optimum material-remover path is over constrained.

The machine tool may be any one of the following machines: a milling machine; a machining centre, a multi-axis machining centre, a lathe.

Conveniently, the material-remover of the machine tool is arranged to rotate about an axis. Such an arrangement is convenient because it facilitates material removal.

Preferably, the processing circuitry is arranged to attempt to move the material-remover such that the magnitude of its velocity is roughly constant. Such an arrangement is advantageous because it is more efficient to run a machine tool at its maximum cutting speed rather than continuously accelerating and decelerating the material-remover and can result in an improved life of the material remover.

However, the processing circuitry may be arranged to vary the speed of the material-remover for some complex cutting paths. It will be appreciated that the path of the material-remover will have a minimum cutting radius, which is a function of the speed of the material-remover and determined by the maximum axis acceleration of the machine.

Therefore, the processing circuitry may be arranged to reduce the speed of the material-remover in order to achieve smaller cutting radii than are possible at the target material-remover speed.

A material-remover has a maximum amount of material that it can remove in a single cut. The minimum amount of material that it can remove in a single cut is zero. The processing circuitry may comprise a track planner arranged to associate one or more tracks around the perimeter of an object to be machined, the or each track comprising a locus of all the possible material remover paths around the object. An advantage of such a track is that it provides a convenient starting point from which to calculate a material-remover path.

Alternatively, or additionally, the processing circuitry may comprise a track planner arranged to associate one or more contours around the perimeter of an object to be machined. In such an embodiment it is preferred to select a contour comprising the centre line of the track (although any value of contour between the zero and the maximum depth of cut is possible).

Conveniently, the track planner is arranged to associate a series of such tracks and/or contours around the perimeter of the object to be fabricated. As such, a series of tracks and/or contours are built up, each providing an indication of possible material-remover paths. Of course, whilst the first track and/or contour is based upon the perimeter of the object to be fabricated, subsequent tracks and /or contours are based upon the previous track and/or contour.

The track planner may produce tracks that are of variable width.

The processing circuitry may further comprise a node associator arranged to associate a number of nodes with predetermined points around the track and/or contour that has been calculated.

Preferably, the node associator is arranged to associate points with corners of the track and/or contour. A corner in the track and/or contour may be defined as any deviation in the track/contour from a straight line that results in a turn tighter than the minimum cutting radius of the material remover. Therefore, if the track/contour incorporates a curve having a radius greater than the minimum turning radius of the material remover no node may be associated therewith.

The node associator may be arranged to associate predetermined nodes with the inside of the track. Additionally the node associator may be arranged to associate other predetermined nodes with the outside to the track.

Conveniently, the node associator is arranged to associate nodes associated with the inside of the track with convex corners of the object to be machined. The node associator may be arranged to associate nodes associated with the outside of the track with concave corners of the object to be machined.

Conveniently, the processing circuitry further comprises a curve associator arranged to associate a curve with each of the nodes produced by the node associator. Preferably, the curve associated with the node by the curve associator has a radius corresponding to the minimum radius of a path of the material-remover of the machine tool. Such an arrangement ensures that it is possible to arrange the path for the material-remover such that it does not result in the velocity of the material remover being reduced because a turn tighter than the minimum cutting radius at its maximum velocity has been specified.

The curve associator may be arranged to determine whether a curve that it is associating with a node produced by the node associator is less efficient than a straight line path, and if this is the case to replace the curve with a straight line path. The skilled person will appreciate that the material remover has momentum, such that small deviations in a path may be smoothed out, and that processing complex paths requires processing power. Therefore, it may be possible to make a path less efficient by introducing curves that attempt to cause the material remover to deviate from a straight line by small amounts whilst increasing the processing required. Therefore, causing the curve associator to assess the efficiency of the curve may be advantageous because it helps to increase the efficiency of the path along which the material remover moves.

The curve associator may be arranged to reduce the radius of one or more curves if curves centred on opposite side of the track intersect one another to block the track. Reducing the radius of the curves in this manner results in a reduction in the cutting speed, but may allow a path to be plotted whereas otherwise, no path may have been possible.

The curve associator may be arranged to associate more than one node with any one curve. Such an arrangement is advantageous in some circumstances (particularly when nodes occur close to one another) because it can remove the need for a number of curves and thus the complexity of the solution may be reduced.

Conveniently, the curves are situated at the nodes generated by the node associator such that the radius of the curve passes close to the node and preferably, the curve is centred on the bisector of the corner. It is convenient for the curve associator to associate curves with the nodes in this manner since this provides a position that is computationally simple to find. Calculation problems may occur if the curve passes inside the node and ensuring that the curve passes close to the node, rather than touching the node provides a safety margin helping the ensure that the curve never passes inside the node.

The curve associator may alter the position of the curve such that it does not lie on the bisector of the corner. This can be advantageous if it allows a curve of larger radius to be associated with the node.

The curve associator may be arranged to associate circles, or portions of circles with the nodes. Circles are convenient since they are mathematically simple, but any tangent continuous curve will suffice. It is preferable that the curvature of the curve is continuous, but not essential.

Preferably, the processing circuitry further comprises a tangent generator arranged to associate a path between each of the curves generated by the curve associator, the path being a tangent to each of the curves that it contacts. An advantage of the tangent generator is that the path so produced is the shortest line around the track produced by the track planner without passing inside the curves generated by the curve associator.

The processing circuitry is preferably arranged to convert the tangents generated by the tangent generator together with portions of the curves provided by the curve associator into a path for the material-remover.

Conveniently, the processing circuitry is arranged to generate paths that form a closed loop around the object to be fabricated. Such an arrangement is advantageous because it completely specifies a path around the object. However, in other embodiments the processing circuitry may be arranged to generate paths that are open and do not form a closed loop around the object to be fabricated.

Preferably the processing circuitry is arranged to produce a series of paths such that an object can fabricated from a block of material. In some embodiments the processing circuitry is arranged to produce linking paths for the material remover linking the series of paths previously calculated. The linking paths may be curves, which run one path into the next. Such linking paths are advantageous because they further help to improve the efficiency of the material removal.

According to a second aspect of the invention there is provided a method of removing material from a block of material surrounding an object to be fashioned, said method comprising plotting a path for a material-remover of a machine tool, said path being optimised by allowing the depth of a cut made by the material-remover to vary.

An advantage of such a method is that it is likely to be more efficient at bulk material removal than prior art methods. Prior art methods are arranged to determine the path of a machine tool around the object to be fashioned such that the material-remover cuts to a substantially constant depth.

Preferably, the method comprises attempting to move the material-remover at roughly a constant speed. Such a method may prove more efficient than continuously accelerating and decelerating the speed of the material-remover and may increase the life of the material-remover.

Conveniently, the method allows the speed of the material-remover to be varied if its path includes a turn requiring an acceleration beyond that which the machine is capable of providing.

The method may comprise calculating a first track around the perimeter of an object to be machined. Said track may occur between the minimum and maximum amounts of material that can be removed in a single cut by the material-remover and comprise the locus of all possible material-remover paths between these minimum and maximum amounts.

Alternatively, or additionally, the method may comprise calculating a contour around the perimeter of an object to be machined, displaced from the object by a predetermined amount.

If a contour is calculated it is preferable that it corresponds to the centre line of a track comprising the locus of all material-remover paths around the perimeter of the object. Thus, the contour corresponds to a path for the material remover corresponding to a cut to a depth of 50% of its maximum in single pass. The contour may however, correspond to a depth of cut for the material-remover at any value from zero to its maximum.

A plurality of tracks and/or contours may be built up around the perimeter of the object to be fabricated, preferably with each successive track and/or contour occurring at a distance corresponding to the maximum depth of material that can be removed by the material-remover in a single cut. Therefore, a series of tracks and/or contours are built up, each providing an indication of the material that it is possible for the material-remover to remove in a series of passes.

Preferably the method comprises associating a number of nodes with predetermined points around the track and/or contour previously calculated. Preferably, each node occurs at points coincident with corners of the track and/or contour. A corner in the track may be defined as any deviation in the track from a straight line that results in a turn tighter than the minimum cutting radius of the material-remover.

Conveniently, predetermined nodes are associated with the inside of the track previously determined. Additionally predetermined nodes may be associated with the outside to the track previously determined.

Nodes associated with the inside of the track may be associated with convex corners of the object to be machined. Nodes associated with the outside of the track may be associated with concave corners of the object to be machined.

A curve may be associated with each of the nodes generated by the method. Preferably, each curve has a radius corresponding to the minimum cutting radius of the material-remover of the machine tool.

Such a method can be used to ensure that the path for the material-remover is such that it does not enter inside the minimum cutting radii associated with a corner of the object to be fabricated and therefore, cause the material-remover to slow. It will be appreciated that it is possible to reduce the minimum cutting radius by slowing the speed of the material-remover, although it is desirable not to alter the velocity of the material-remover.

Conveniently, the method arranges the curves at the nodes such that the radius of the curve passes close to the node and preferably, the curve is centred on the bisector of the corner. It is convenient for the curve to be positioned in such a manner since this provides a position that is computationally simple to find.

Further, the method comprises plotting a path comprising a tangent between each of the curves, together with a portion of one or more of the curves. An advantage of such tangents is that the path so produced is the shortest line around the track without passing inside the curves corresponding to the minimum cutting radii.

The method may comprise reducing the radii of curves associated with the nodes if the curve extends beyond the track. Such a method helps to ensure that the path is possible.

Conveniently, the method generates one or more paths that forms closed loops around the object to be fabricated. Such an arrangement is advantageous because it completely specifies a path around the object. However, in other embodiments the method generates one or more paths that are open and do not form a closed loop around the object to be fabricated.

According to a third aspect of the invention there is provided a method of plotting a path for the material-remover of a machine tool, wherein said method comprises allowing the depth of a cut performed by the material-remover to vary.

The method of the third aspect of the invention may take any of the features from the second aspects of the invention.

According to a fourth aspect of the invention there is provided a computer readable medium coded with instructions to cause a computer to perform the method according to the second aspect of the invention.

According to a fifth aspect of the invention there is provided a computer readable medium coded with instructions to cause a computer to perform the method according to the third aspect of the invention.

The computer readable medium of the fourth or fifth aspects of the invention may comprise a disk, a ZIP disk, an LS120 disk, a CDROM, a DVD ROM/RAM, any other form of magneto and/or optical storage, or may comprise an email, an internet download, or any other transmitted signal.

There now follows by way of example only a detailed description of an embodiment of present invention with reference to the accompanying drawings of which.

Figure 9:
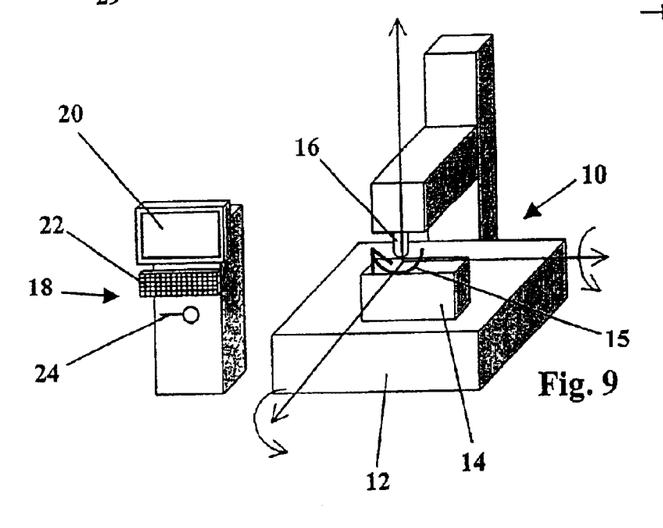
FIG. 9 shows a typical machine tool according to the invention.

The machine tool 10 of FIG. 9 is a 5-axis milling machine, which comprises a work receiving area 12 arranged to hold material 14 such that the material can have work performed thereon, a material-remover 16 for working on the material 14, and processing circuitry 18 for controlling the tool 10. The material-remover 16 rotates at high speed about its axis, as marked by the arrow 15 in the Figure.

The processing circuitry comprises a display 20 arranged to display information, keyboard 22 for inputting information to the processing circuitry 18, and a data carrier reader 24 arranged to read media such as CD-ROMs, etc. In some embodiments the processing circuitry 18 may be a computer such as a PC, etc. interfaced to the machine tool. In other embodiments the processing circuitry may be provided as part of the machine tool 10.

The processing circuitry 18 is capable of receiving code, either via the keyboard 22 or via the data reader 24. This code programs the processing circuitry to control the material-remover of the machine tool 10 to process the material 14 to fabricate the desired object.

An example object that it is desired to fabricate is seen in the Figures as a block 2. Once the object 2 has been completely specified to the processing circuitry 18, the processing circuitry proceeds to calculate a path for the material-remover 16 such that the object can be cut from the material 14. This process can be broken into two stages: a first, roughing, which removes excess material as quickly and efficiently as possible; the second performing final cleaning of the object 2.

Figure 15:
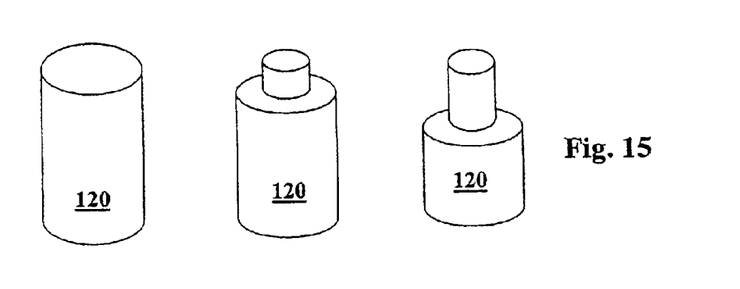
FIG. 15 illustrates how the method can be applied to manufacture a three dimensional cylinder.
Figure 17:
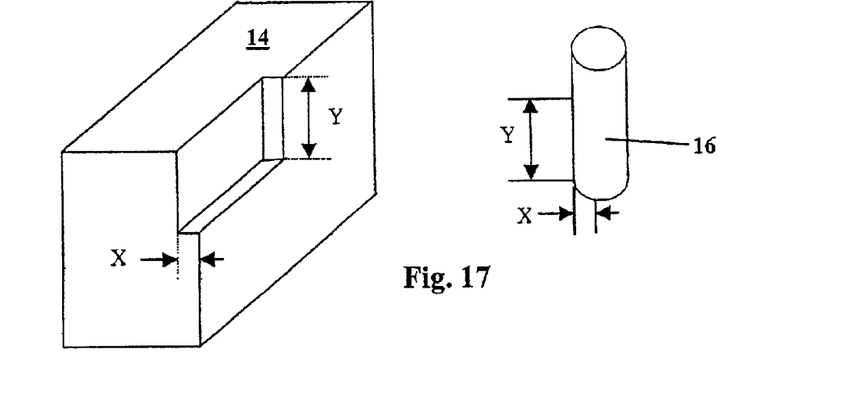
FIG. 17 shows two cutting depths that are needed to completely specify a cut for a material remover.

It will be appreciated that the object 2 shown in the Figures is a two-dimensional and that real objects are in fact three-dimensional. For reasons of clarity the method described below is described in relation to the two-dimensional object 2. FIGS. 15 and 17 illustrate how the method could be applied in three dimensions. Firstly, looking at FIG. 17 it will be appreciated that the material remover 16 is itself three dimensional and has a maximum amount of material that it can remove in both the X and Y directions from the material 14.

Turning to FIG. 15 a cylinder 120 has a series of cuts of material removed therefrom with the material remover 14 passing in a circular manner around the cylinder 120. The leftmost Figure shows a cylinder 120 on which no cuts have been performed, the middle Figure shows a cylinder on which a single cut has been performed, and the rightmost Figure shows the cylinder after two cuts have been performed.

These cuts can be continued until the necessary material has been removed, effectively providing a number of terraces around the cylinder 120.

Figure 8:
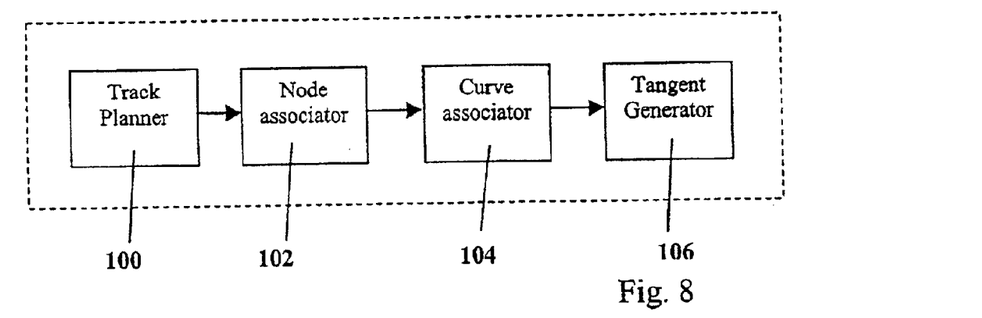
FIG. 8 schematically shows a processing circuitry of the invention.

To perform the roughing of the material 14 the processing circuitry calculates a machine tool path in the following manner:

The material-remover 16 has a maximum depth that it can cut in any one pass (in both the X and Y directions as shown in FIG. 17). This value will depend on the properties of the material being cut, and also on the material-remover, but is a known value and these known values are entered to the processing circuitry 18. Therefore, in one embodiment he first step in the process is to plot a track 26 around the perimeter of the object 2, whose depth X corresponds to the maximum depth that the material-remover 16 can remove in single pass. This track 26 shows the range of values that the material-remover 16 can remove in one pass (the minimum value is of course zero) and thus provides a locus of all the possible paths that a material-remover can perform in a single cut around the object. As can be see in FIG. 8 the processing circuitry comprises a track planner 100 for calculating this track 26.

Figure 4:
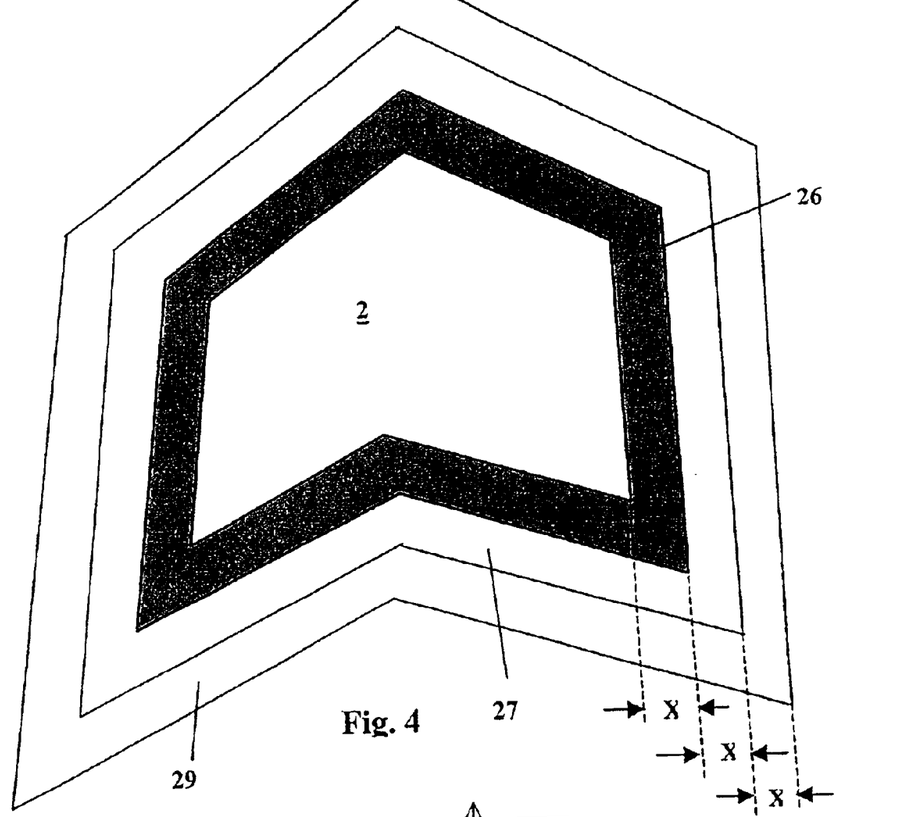
Figure 18:
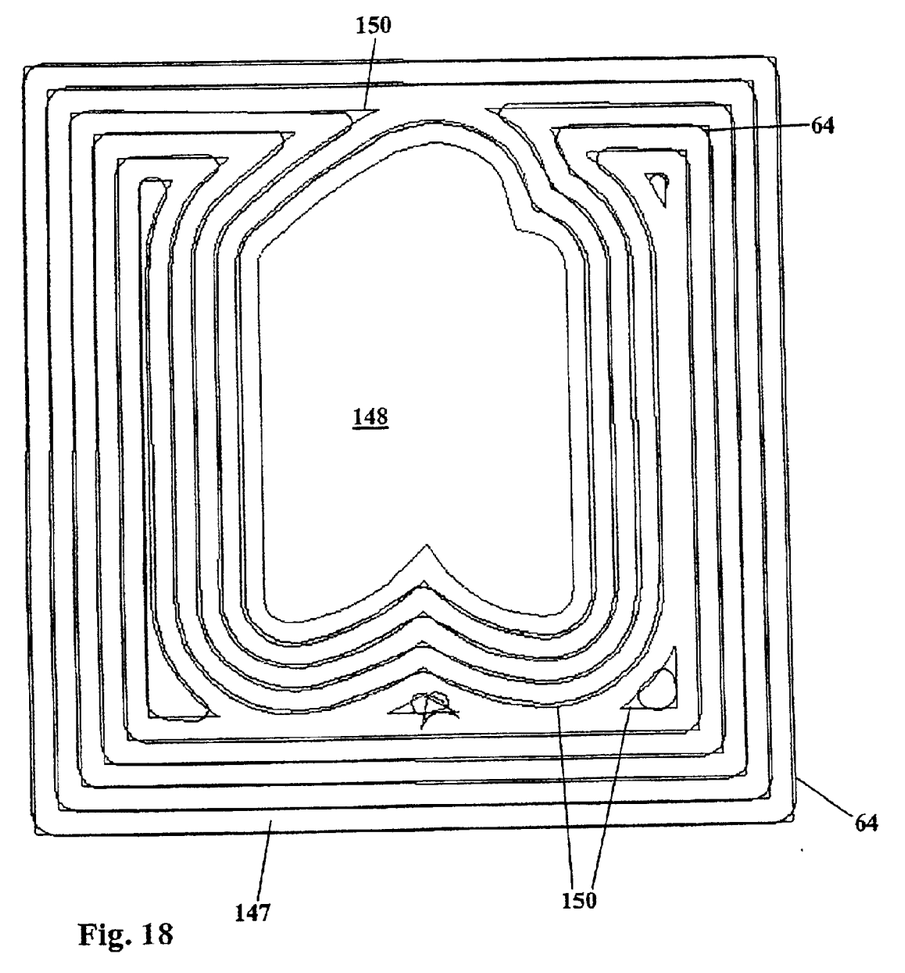
FIG. 18 shows a series of example paths that have been calculated for a material remover.

As can be seen from FIGS. 4 and 18 if a single track 26 does not plot a path allowing the material-remover 16 to remove all of the desired excess material 14 then multiple tracks can be built up around the perimeter of the object to be fabricated. Two extra tracks 27, 29 are shown in FIG. 4 each of which allows a path to be calculated for the material-remover 16, and so a series of paths can be built up for the material-remover 16. Each of the tracks 26, 27, 29 has the same depth X representing the maximum cutting depth of the material-remover 16.

Figure 5:
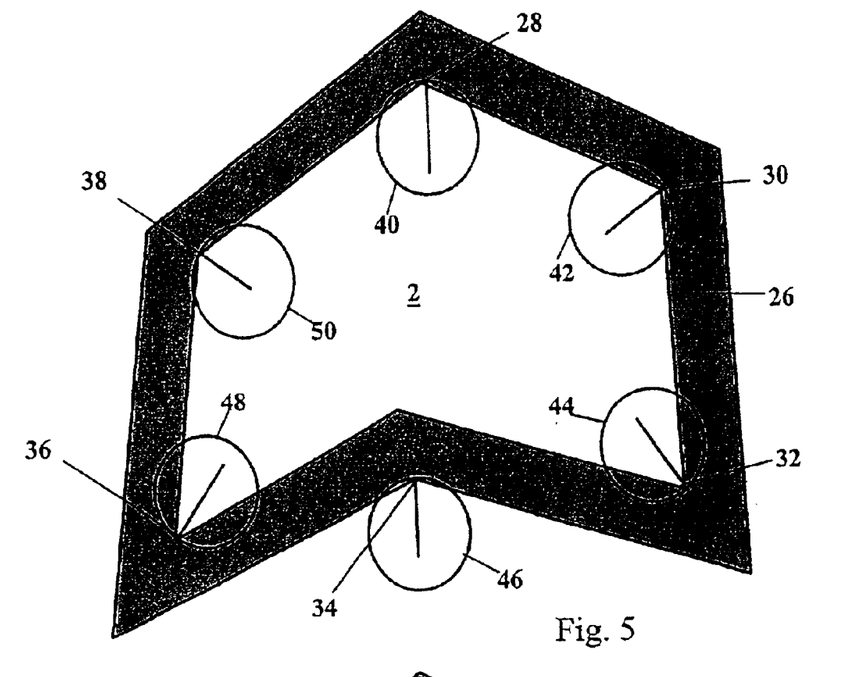

The next step is to associate a plurality of nodes with the track 26 around the object 2. A node is associated with every corner of the object 2 and therefore, as seen in FIG. 5, six nodes 28, 30, 32, 34, 36, 38 are associated with the track 26. A node associated with a convex corner of the track 26 is placed on the inside of the track 26 (e.g. node 28, 30, 32, 36, 38), whereas a node associated with a concave corner (e.g. node 34) of the track 26 is associated with the outside of the track 26. The processing circuitry comprises a node associator 102 to associate the nodes with the corners.

Next, a circle 40, 42, 44, 46, 48, 50, having a radius equal to the minimum cutting radius of the material-remover 16 is associated with each of the nodes. This radius is marked on each of the circles 40, 42, 44, 46, 48, 50 in FIG. 5. It will be appreciated that the material-remover 16 will have a minimum cutting radius governed by the maximum force that the machine tool 10 can provide on any particular axis. This acceleration will of course be related to the velocity of the material-remover 16 (angular acceleration is the product of the force available and the reciprocal of the angular momentum). The circumference of each circle 40, 42, 44, 46, 48, 50 passes close to the node, and the centre of the circle lies on a bisector of the corner. The processing circuitry comprises a curve associator 104 to associate the circles with the nodes.

Strictly, placing the centre of the circle on the bisector does not yield the optimal result. The optimal placing of the circle centre is such that the trimmed start and end points of each arc are the same distance from the track wall. However, placing the centre on the bisector, provided the track is narrow (so that the final cutting path is approximately parallel to the track 26 walls), will give a result close to optimum.

The track 26 cannot be completely blocked by any on the circles placed therein. If this occurs then there will be no way to plot the path 64 along the track 26. If the track 26 is blocked then the radius/positioning of the circles is altered as discussed below.

Figure 6:
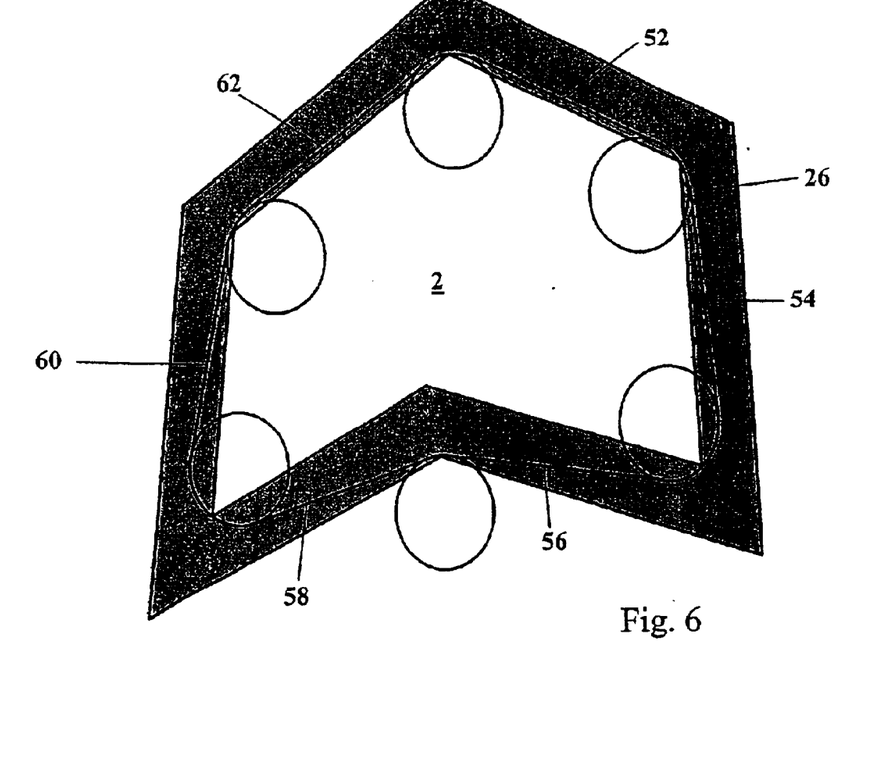

Once the circles 40, 42, 44, 46, 48, 50 are placed then a tangent 52, 54, 56, 58, 60, 62 to each of the circles is plotted to join the circles. It may be possible to avoid touching some of the circles while doing this, provided that the lines so drawn remain within the track 26. The processing circuitry comprises a tangent generator 106 to generate tangents to link the circles generated by the circle associator 104.

Figure 7:
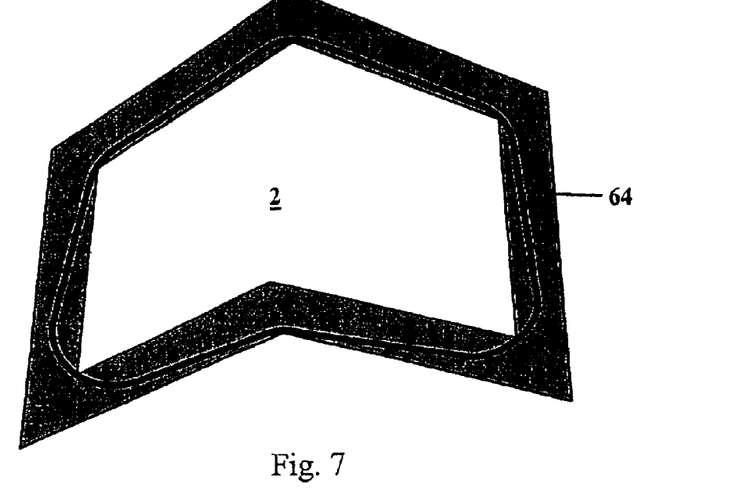

Once the tangents 52, 54, 56, 58, 60, 62 have been calculated then unwanted portions of the circles are deleted leaving a calculated path 64 for the material-remover 16.

The above method for calculating the path 64 provides a solution to a global optimisation problem in which the adjustment of a single corner affects all of the other corners in the path and may be thought of as plotting a racing line around the track 26.

Figure 10A:
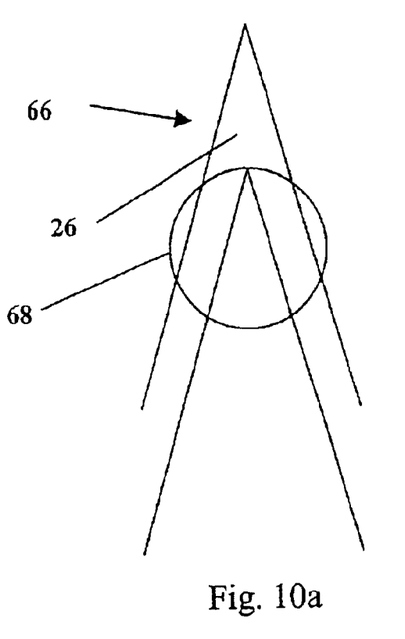
FIGS. 10 and 11 shows examples of situations in which method of the invention may need to be modified.
Figure 10B:
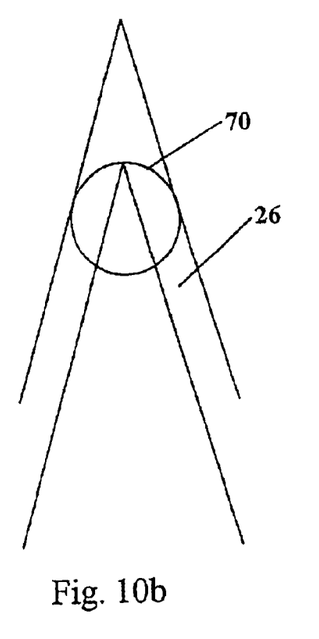

Although the above method for calculating the path 64 for the material-remover 16, is generally acceptable there are a number of situations where modifications have to be made. FIG. 10a shows a track 26 having a corner 66 therein. Running the method described above could associate a circle 68 with the corner 66. However, such a circle 68 will not result in a valid path 64 for the material-remover 16 since a tangent plotted for this circle 68 will lie outside the track 26. Therefore, as shown in FIG. 10b the radius of the circle 68 must be reduced such that it fits within the track 26. Thus, the circle 70 is associated with the corner. The reduced radius of the circle 70 means that the speed of the material-remover 16 will need to be reduced for this corner.

Figure 11:
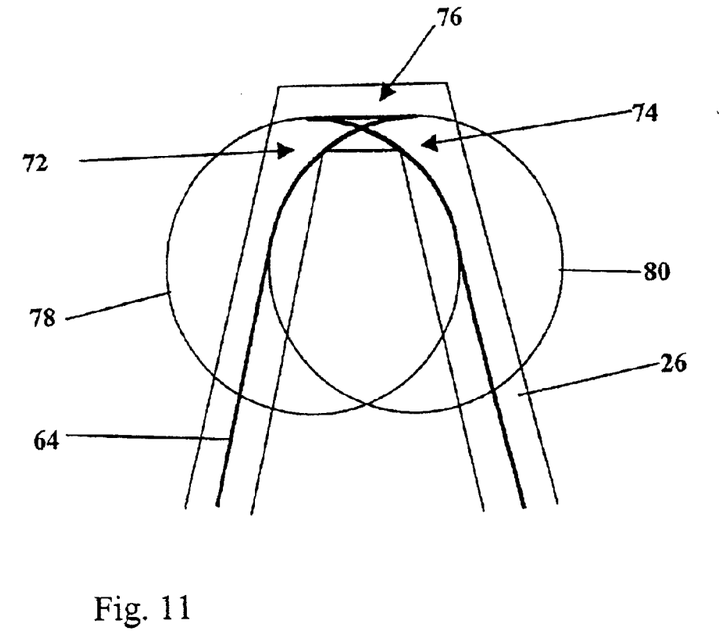
Figure 16:
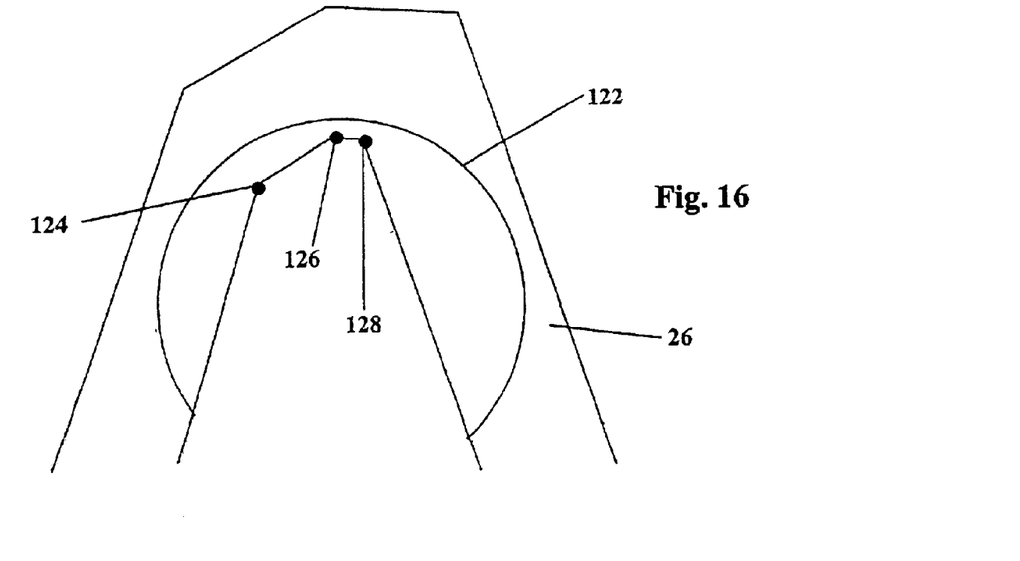
FIG. 16 illustrates how the method of the invention can be modified for a plurality of nodes occurring close to one another.

A further situation in which the method needs to be modified is shown in FIG. 11. This situation occurs when two corners 72, 74 occur in close proximity to one another. If the standard method above were applied then the path 64 calculated as above crosses over itself and gives a self intersecting path as can be seen at region 76 in the Figure. The circles plotted completely block the track 26 so that there is no way to plot a path between them and again, the radius of circles 78, 80 needs to be reduced in this region to generate a suitable path 64. Alternatively, as shown in FIG. 16 it is possible to associate a single circle 122 with a plurality of nodes 124, 126, 128 so that the track 26 is not blocked.

Figure 12:
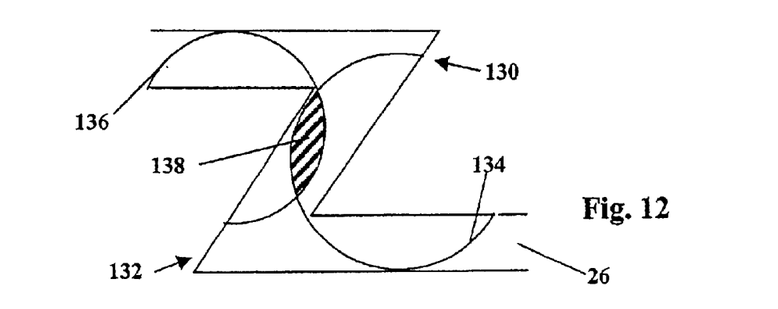
FIG. 12 shows a further situation in which the method may need modifying.
Figure 13:
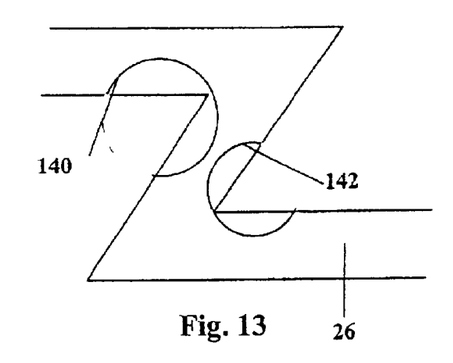
FIGS. 13 and 14 shows possible solutions to the situation of FIG. 12.
Figure 14:
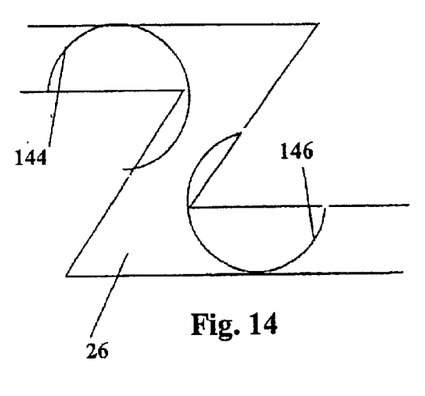

A further example in which the method may be modified is shown in FIGS. 12 to 14 and can be likened to a chicane, comprising two oppositely oriented corners 130, 132 in close proximity. FIG. 12 shows the corners 130, 132 once circles 134, 136 have been associated with the nodes. It will be clear from overlap of the circles 138 in FIG. 12 that the circles 134, 136 completely block the track 26 so that there is no way to plot a tangent between them. Therefore, as before it is necessary to reduce the diameter of the circles 134, 136 (which will of course result in a reduction of the velocity of the material remover 16).

FIG. 13 shows chicane of FIG. 12 in which the diameter of the circles 134, 136 have been reduced so that a path can now be plotted between the circles. In FIG. 13 the circles of reduced diameter 140, 142 are positioned such that their centre lies on the bisector of the corner.

FIG. 14 shows a variation on this arrangement that can result in an increased radius for the circles (which is desirable since it will result in a higher velocity for the material remover in that region). The circles 144, 146 of FIG. 14 no longer have their centres provided on the bisector of the corners. It is still possible to plot a tangent between the two circles 144, 146 and remain within the track 26.

FIG. 18 shows a series of paths 64 that have been calculated within a block of material 147 around an object 148. Each of the paths 64 forms a closed loop around the object 148. Whereas FIGS. 3 to 7 show the path 64 calculated in conjunction with a track 26 that corresponds to the maximum cutting depth of the material remover, FIG. 18 shows a plurality of paths 150 that correspond to a contour, or a cut of 50% depth (these correspond to the more angular paths of the Figure). The paths 150 correspond to the centre line of the tracks 26 and the generation of the centre line is an alternative method of plotting the path 64.

The innermost contour corresponds to the perimeter of the object 148 and has not been changed. Therefore, the final path 64 would correspond to the perimeter of the object 148, and must therefore be followed exactly. Looking at the other contours it is possible to see that sharp corners have been rounded. Thus, the paths 64 allow the velocity of the material remover 14 to be maintained by varying the depth of the cut.

FIG. 18 shows that a series of paths 150 must be planned to produce the object 148 from the material 147. These paths are shown in the Figure as a series of independent paths. However, the material remover must of course pass from one path to the next. A linear movement to the next path may achieve this once a path has been finished. However, in some embodiments one path is linked to the previous by a curve, that effectively links the paths into a continuous single path. The resulting path may approximate to a spiral.

What is claimed is:

1. A machine tool arranged to machine an object from material that is being processed and having a material-remover, said material-remover having at least two degrees of freedom of movement and at an instant being arranged to move with a velocity and to remove an amount of material up to a depth of cut from the material that is being processed, processing circuitry being provided and arranged to control the movement of said material-remover including being arranged to control said depth of cut, the processing circuitry further comprising a track planner arranged to associate one or more tracks around the perimeter of the object to be machined, the or each said track comprising a locus of paths bounded by the minimum and maximum depths of cut that the material-remover can be controlled along around the object in a single pass, the processing circuitry being further arranged to determine the path also which the material-remover is caused to move from within the or each track, allowing said depth of cut to vary such that a predetermined speed is maintained as the material-remover moves along the determined path, the processing circuitry further comprising a node associator arranged to associate nodes, each having a radius, with predetermined points of the or each track such that the determined path is tangent to the nodes.

2. The machine tool of claim 1 in which the machine tool is a milling machine.

3. The machine tool of claims 1 in which the material-remover of the machine tool is arranged to rotate about an axis.

4. The machine tool of claim 1 in which the processing circuitry is arranged to attempt to move the material-remover such that the magnitude of the velocity of the material-remover is roughly constant.

5. The machine tool of any of claim 1 in which the track planner is arranged to associate one or more contours around the perimeter of an object to be machined, the or each said contour comprising a line within the or each track.

6. The machine tool of claim 5 in which the node associator is arranged to associate a number of the nodes with predetermined points around the or each contour.

7. The machine tool of claim 6 in which the node associator is arranged to associate the nodes with corners of the or each contour.

8. The machine tool of claim 1 in which the track planner is capable of producing tracks that are of variable width.

9. The machine tool of claim 1 in which the node associator is arranged to associate the nodes with corners of the or each track.

10. The machine tool of claim 1 in which the or each track comprises an inside edge region and an outside edge region, said inside edge being shorter than said outside edge region and in which the node associator is arranged to associate at least some of the nodes with the inside edge region of the or each track.

11. The machine tool of claim 10 in which the node associator is arranged to associate other predetermined nodes with the outside edge region of the track.

12. The machine tool of claim 1 in which the processing circuitry further comprises a curve associator arranged to associate a curve with each of the nodes produced by the node associator.

13. The machine tool of claim 12 in which each curve associated with a node by the curve associator has a radius corresponding to the minimum radius of a path of the material-remover of the machine tool.

14. The machine tool of claim 12 in which the curve associator is arranged to reduce the radius of one or more of the or each curves if curves centered on opposite edge regions of the or each track intersect one another to block the or each track.

15. The machine tool of claim 12 in which the curve associator is arranged to associate more than one node with any one curve.

16. The machine tool of claim 12 in which the curve associator is arranged to associate circles, or portions of circles with each of the nodes.

17. The machine tool of claims 12 in which the processing circuitry further comprises a tangent generator arranged to generate tangents to form a path between each of the curves that the path contacts.

18. The machine tool of claim 17 in which the processing circuitry is arranged to convert the tangents generated by the tangent generator together with portions of the or each curve provided by the curve associator into a path for the material remover.

19. The machine tool of claim 1 in which the processing circuitry is arranged to generate paths that form a closed loop around the object to be fabricated.

20. The machine tool of claim 1 in which the processing circuitry is arranged to produce a series of paths such that the object can be machined from a block of material.

21. A computer readable medium coded with instructions that when loaded into a machine tool according to claim 1 cause the machine tool to be controlled such that the one or more tracks are associated around the perimeter of the object to be machined, the nodes are associated with the predetermined points of the track, and the path is determined such that the depth of cut thereof varies and such that the path is tangent to the nodes.

22. The machine tool of claim 1 in which the material-remover is arranged to rotate about an axis and in which the depth of cut is defined in a direction radial to the rotation axis.

23. A machine tool arranged to machine object from material that is being processed and having a material-remover, said material-remover having at least two degrees of freedom of movement, and at an instant being arranged to remove an amount of material, up to a depth of cut, from material that is being processed, processing circuitry being provided and arranged to control the movement of said material-remover, said processing circuitry determining a path along which said material-remover should move, and in determining said path, said processing circuitry allowing said depth of cut to be made by the material-remover to vary, the processing circuitry further comprising a track planner arranged to associate one or more contours around the perimeter of an object to be machined, the or each said contour comprising a locus of the paths the material-remover can be controlled along around the object, the processing circuitry further comprises a node associator arranged to associate a number of nodes, each having a radius, with predetermined points around the or each contour that has or have been associated, the processing circuitry further comprising a curve associator arranged to associate a curve with at least a portion of the periphery of each of the nodes produced by the node associator, the processing circuitry further comprises a tangent generator arranged to associate a path between each of the curves generated by the curve associator, wherein the processing circuitry is arranged to convert the tangents generated by the tangent generator together with portions of the curves provided by the curve associator into a path for the material remover.

* * * * *